United States Patent [19]
Kuriyama et al.

[11] Patent Number: 5,251,275
[45] Date of Patent: Oct. 5, 1993

[54] TUNABLE FIBER FABRY-PEROT ETALON OPTICAL FILTER

[75] Inventors: Toshihide Kuriyama; Masahiko Fujiwara, both of Tokyo, Japan

[73] Assignee: NEC Corporation, Japan

[21] Appl. No.: 880,227

[22] Filed: May 8, 1992

[30] Foreign Application Priority Data

May 8, 1991 [JP] Japan .................... 3-102281

[51] Int. Cl.⁵ .................... G02B 6/12; G02B 6/26
[52] U.S. Cl. .................... 385/14; 385/50
[58] Field of Search .............. 385/14, 50, 8, 9, 27; 356/352; 372/6; 359/315, 317, 318

[56] References Cited

U.S. PATENT DOCUMENTS

| | | | |
|---|---|---|---|
| 4,830,451 | 5/1989 | Stone | 385/31 |
| 4,861,136 | 8/1989 | Stone et al. | 385/27 |
| 4,994,791 | 2/1991 | Taylor | 350/352 |

OTHER PUBLICATIONS

Streetman; "Solid State Electronic Devices"; 1980 pp. 7-9.
S. M. Sze; "Semiconductor Devices Physics and Technology"; Jan. 1985; pp. 6 and 7.

Primary Examiner—John D. Lee
Assistant Examiner—John Ngo
Attorney, Agent, or Firm—Laff, Whitesel, Conte & Saret

[57] ABSTRACT

A pendulum-like member is formed in a silicon substrate. Optical fiber portions which include endface mirrors are disposed on the substrate proper and on the pendulum member. The position of the pendulum member is adjusted by applying a voltage across the member and an adjacent section(s) of the substrate thus enabling the optical length of the device to be adjusted.

8 Claims, 4 Drawing Sheets

TUNABLE FIBER FABRY-PEROT ETALON OPTICAL FILTER

BACKGROUND OF THE INVENTION

1. Field of the Invention

The present invention relates to an optical length controllable Fabry-Perot etalon, and more specifically to such an optical filter wherein tuning is achieved by controlling a movable portion made of silicon. The present invention can be made by usual LSI (Large Scale Integration) techniques and features very simple assembly and low manufacturing costs.

2. Description of the Prior Art

In order to attain highly effective communications using optical fibers, it is known to utilize multichannel wavelength division multiplexing arrangements. In such arrangements it is required to select a desired optical wavelength (viz., channel) from a plurality of optical channels. One useful component for achieving this optical channel selection is a Fabry-Perot etalon tunable optical filter.

One known tunable Fabry-Perot etalon (viz., interferometer) is disclosed in an article published in Electronics Letters, Jul. 16, 1987, Vol. 23, No. 15, pages 781–783 entitled "Pigtailed High-Finesse Tunable Fibre Fabry-Perot Interferometers with Large, Medium and Small Free Spectral Ranges" by J. Stone and L. W. Stulz (prior art paper 1).

Stone et al. disclose three kinds of fiber Fabry-Perot (FFP) tunable filters. For all three types of device, the fiber ends are encapsulated in standard glass or ceramic ST ferrules. The fiber ends are polished and coated with multi-layer dielectric mirrors. The ferrules are held in alignment with either a split zirconia sleeve or a solid zirconia sleeve. This assembly is then placed in a cylindrical PZT piezoelectric shell, and the ends of the shell are epoxied (bonded) to the ferrules.

Stone et al. (prior art paper 1) uses a cylindrical piezoelectric shell and also utilizes a zirconia sleeve for preventing fibers from being undesirably displaced. This prior art, however, has encountered problems that an expensive component such as piezoelectric shell must be used and hence leads to high manufacturing costs. Further, a large number of elements are employed with the result of complex assembly. Still further, this prior art is found unsuitable for mass production using large scale integration techniques.

Another prior art of tunable Fabry-Perot etalon is disclosed in an article published in Journal of Lightwave Technology, Vol. 7, No. 4, April 1989, pages 615–624 entitled "Angled-Tuned Etalon Filters for Optical Channel Selection in High Density Wavelength Division Multiplexed System" by Anatoly Frenkel and Chinlon Lin (prior art paper 2).

Frenkel et al. discloses an in-line fiber-coupled angle-tuned Fabry-Perot etalon. Lensed collimated-beam type single-mode fiber connectors are used for collimating and refocusing the beam into the fiber. A Fabry-Perot etalon is mounted on a rotating stage which accomplishes the wavelength selection simply by angle adjustment.

This mechanical type of angle-tuned or rotatable Fabry-Perot etalon is advantageous for lowering an overall manufacturing costs of the system. However, as the thickness of the etalon increases, displacement of beams which issue from the etalon becomes larger and accordingly increases an insertion loss.

SUMMARY OF THE INVENTION

It is an object of the present invention to provide a tunable Fabry-Perot etalon filter which features an integrated semiconductor body on which optical fibers are provided.

Another object of the present invention is to provide a tunable Fabry-Perot etalon filter which features simple construction and easy assembly.

Another object of the present invention is to provide a tunable Fabry-Perot etalon filter which includes a movable portion formed of a suitable substrate such as silicon, on which an optical fiber with a mirror at one endface thereof is placed.

In brief, the above objects are achieved by an arrangement wherein a pendulum-like member is formed in a silicon substrate. Optical fiber portions which include endface mirrors are disposed on the substrate proper and on the pendulum member. The position of the pendulum member is adjusted by applying a voltage across the member and an adjacent section(s) of the substrate thus enabling the optical length of the device to be adjusted.

More specifically an aspect of the present invention comes in a tunable Fabry-Perot etalon optical filter, comprising: a substrate which is divided into first, second and third substrate portions, the second substrate portion being arranged in a manner to be adjacent to the first and third substrate portions and displaceable with respect to the first and third substrate portions in response to a voltage difference between the second substrate portion and one of the first and third substrate portions; and first, second and third optical fibers portions which are respectively positioned on the first, second and third substrate portions, each of first and third optical fiber portions being provided with a mirror at the endface thereof for acting as an optical filter.

Another aspect of the present invention comes in a tunable Fabry-Perot etalon optical filter comprising: means defining a pendulum-like member in a substrate: a first optical fiber portion supported on the pendulum-like member, the first optical fiber portion having a first mirror formed on an endface thereof; second and third fiber portions being supported on the substrate in a predetermined relationship with respect to the first optical fiber portion, one of the second and third fiber portions having a second mirror formed on an endface thereof.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

The preferred embodiment of the present invention will be discussed with reference to FIGS. 1–15.

Figure 1:
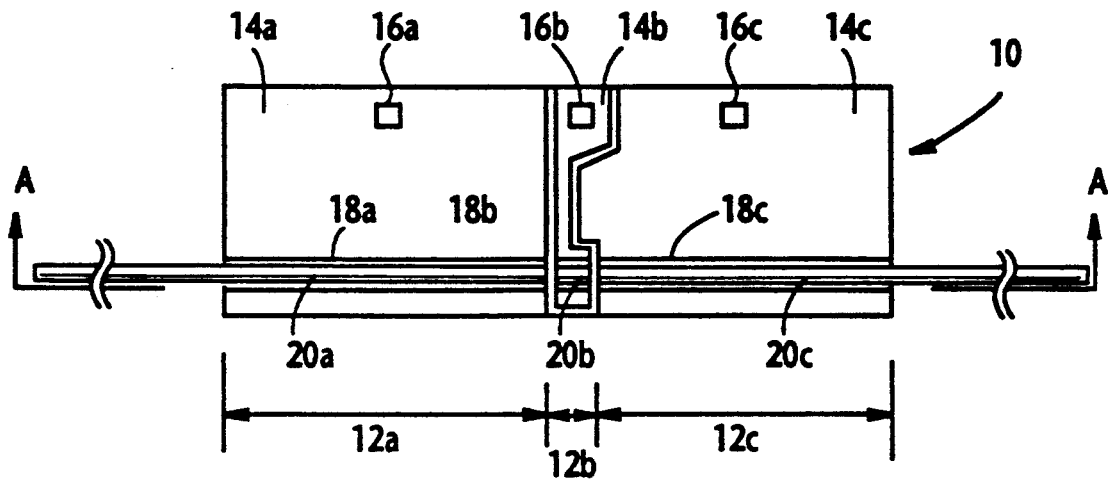
FIG. 1 is a plan view of an embodiment of the present invention.
Figure 2:
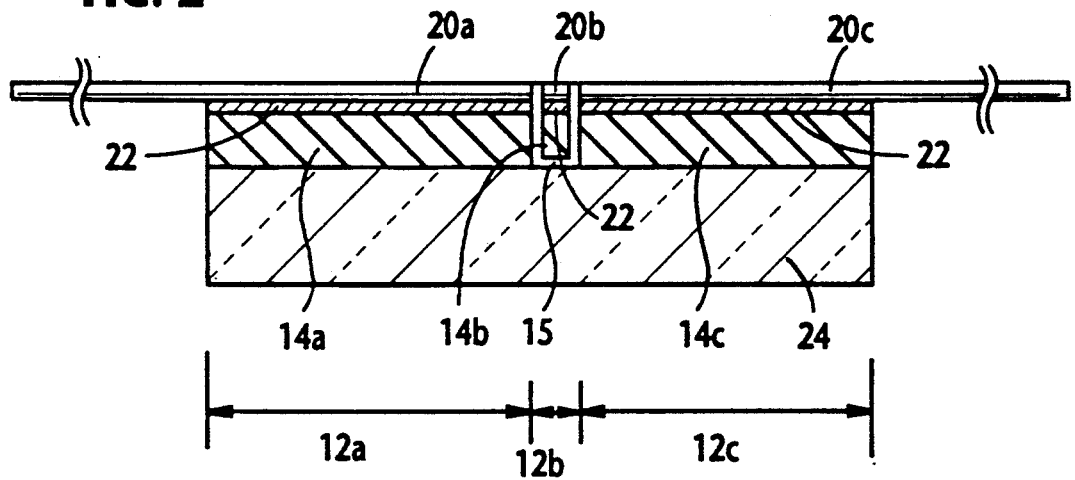
FIG. 2 is a cross section taken along a line A—A.

FIG. 1 is a plan view of a Fabry-Perot optical etalon filter 10 according to the embodiment, while FIG. 2 is a cross sectional view taken along a section line A—A of FIG. 1. The Fabry-Perot etalon optical filter to which the present invention is applied, may be referred to merely as an optical filter for the sake of simplifying the description.

As illustrated in FIG. 1, the optical filter 10 is generally comprised of three sections 12a–12c which include respectively silicon layers 14a–14c. The central section 14b is configured in an irregular manner in this particular case and accordingly, the sections 12a–12c do not exactly designate the corresponding portions and are given merely for the convenience of description.

The silicon layers 14a–14c respectively carry metal electrode pads 16a–16c thereon. Further, the silicon layer 14a–14c are respectively provided with grooves 18a–18c within which optical fibers (indicated in gray) 20a–20c are accomodated.

As shown in FIG. 2, each of the optical fibers 20a–20c are respectively fixed, using suitable adhesive 22, to the corresponding silicon layers 14a–14c. FIG. 2 shows the silicon layers 14a, 14c disposed on a glass plate 24. The silicon layer 14b is shown, in FIG. 2, in a manner to be suspended over the glass plate 24 via a clearance or space 15.

Although not shown in FIGS. 1 and 2, a mirror is applied to each of the right-hand endfaces of the optical fibers 20a and 20b, and thus optical tuning is achieved by changing the optical length between the two mirrors. The optical tuning itself is well known in the art and hence further descriptions thereof will be deemed unnecessary.

Figure 3:
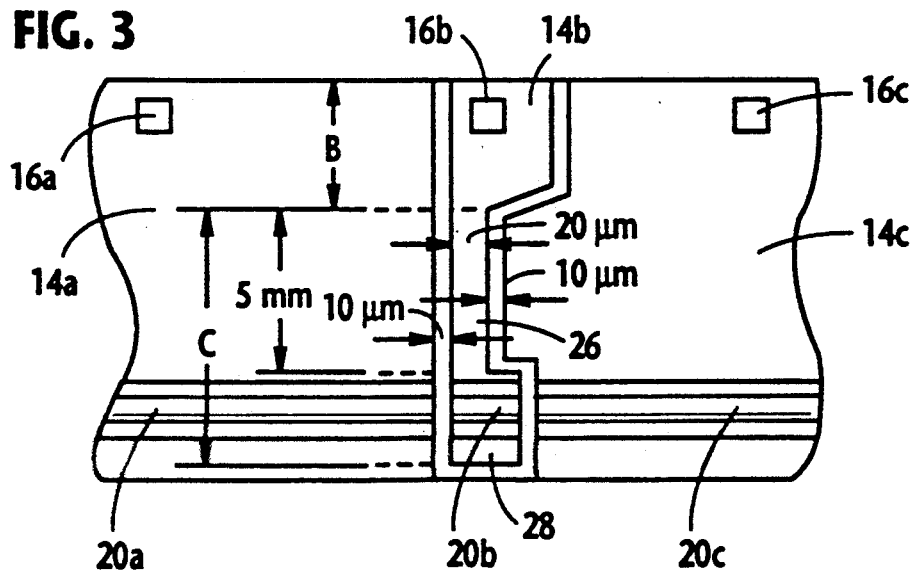
FIG. 3 is an enlarged plan view showing a portion of FIG. 1.

The section 12b will be referred to in more detail with reference to FIG. 3 which is a close-up plan view of a central portion of FIG. 1. Although not shown in FIG. 3, one of the silicon layer 14b, denoted by character B, is fixed, at the bottom thereof, to the glass plate 24 (FIG. 2), while the remainder of the silicon layer 14b (denoted by character C) is suspended in a manner to define narrow clearances between the glass plate 24 (FIG. 2) and the adjacent silicon layers 14a, 14c (FIG. 2). In more specific terms, the portion C of the section 12b forms a movable portion and, includes an arm 26 and an optical fiber depositing portion 28.

As mentioned above, the silicon layer 14b is separated from the adjacent silicon layers 14a, 14c. It is assumed, by way of example, that: (a) the layer 14b is separated from the layers 14a, 14c by a distance of 10 μm and (b) the arm 26 has a length of 5 mm and a width of 20 μm, as shown in FIG. 3. It should be noted that the FIG. 3 arrangement is not drawn in a manner to exactly reflect the relationship of the above mentioned dimensions.

With the above arrangement, in the event that the difference of voltages applied to the electrodes pads 16a, 16b is changed from 0V to 80V, then the optical length (viz., resonance length of the Fabry-Perot optical filter) can be shortened up to 50 nm. Thus, by suitably controlling the voltage difference between the silicon layers 14a, 14b, a desired light wave length can be permitted to pass through the optical filter 10 as is well known in the art.

On the other hand, if it is required to expand the optical length between the above mentioned mirrors, it is necessary to induce a voltage difference between the silicon layers 14b, 14c by applying different potentials to the electrode pads 16b, 14c. It is understood, therefore, that when a voltage difference exists between adjacent silicon layers 14a–14b or 14b–14c, the distance of the adjacent silicon layers 14a–14b or 14b–14c are changed.

A method of fabricating the Fabry-Perot type optical filter of the embodiment in question will be discussed with reference to FIGS. 4–15.

Figure 4:
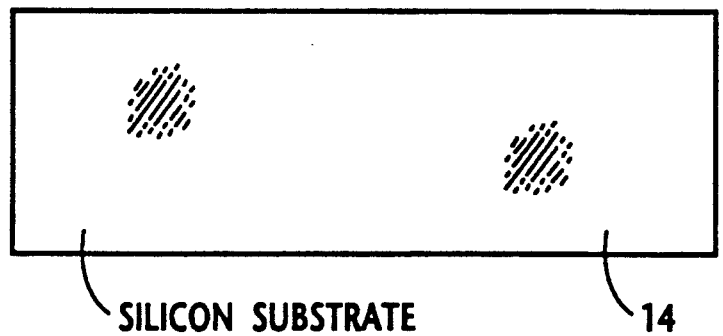
FIGS. 4 to 12 are views depicting the manner in which the embodiment of the invention is fabricated.
Figure 5:
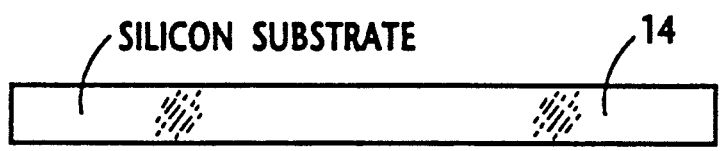

FIG. 4 is a plan view of a silicon substrate 14, while FIG. 5 is a side elevational view of the silicon substrate 14 of FIG. 4. The silicon substrate 14 is prepared such that each of the major surfaces thereof is a <100> plane in order to facilitate the use of known fabrication steps/techniques.

The silicon substrate 14 is divided into the three portions 14a–14c during the following steps.

The major surfaces (viz., top and bottom surfaces) of the silicon substrate 14 are oxidized in a high temperature atmosphere (viz., heat-oxidized), to form an oxidized silicon layer having a depth of 300 nm thereon.

Figure 6:
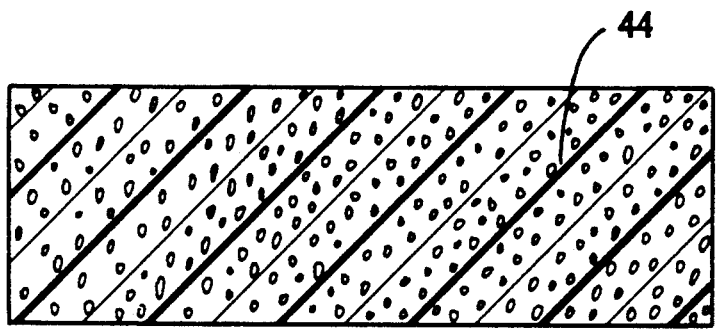
Figure 7:
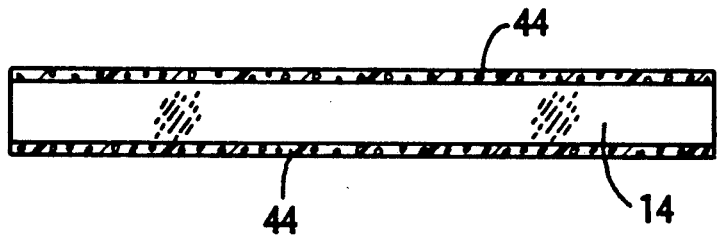

FIG. 6 is a plan view showing the top surface of the silicon substrate 14 is covered by the oxidized silicon layer (denoted by numeral 44), while FIG. 7 is a side elevation of FIG. 6.

Figure 8:
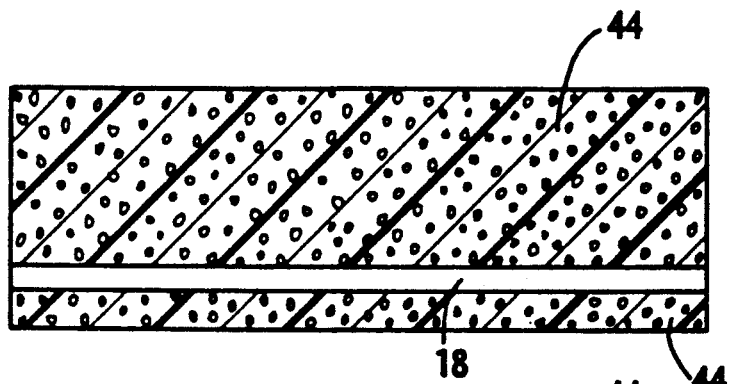
Figure 9:
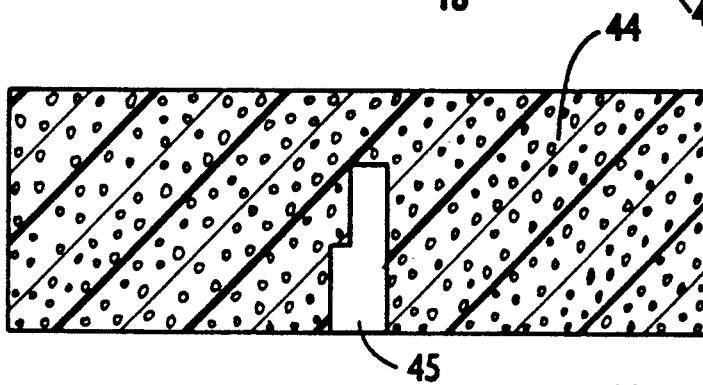

Reference is made to FIGS. 8 and 9. After completing the above mentioned fabricating steps, part of the oxidized silicon layer 44 provided on the top surface of the silicon substrate 14, which correspond to the grooves 18a–18b, is removed using conventional photolithography techniques. FIG. 8 is a top plan view after the etching and shows that the corresponding portion of the silicon substrate (denoted by numeral 18) is exposed. Similarly, part of the oxidized silicon layer 44 on the bottom surface of the silicon substrate 14, which corresponds to the portion under the movable portion C (FIG. 3), is removed as in the above case. FIG. 9 is a bottom plan view after the etching is finished wherein the exposer portion of the substrate 14 is denoted by numeral 45.

Subsequently, the exposed portions 18 and 45 of the silicon substrate 14, are further etched by an anisotropic etching solution such as potassium hydroxide. The configuration of the silicon substrate 14 after the just mentioned etching, is illustrated in FIGS. 10–12, wherein FIG. 10 is a plan view and FIGS. 11, 12 are cross sectional views taken along lines D—D and E—E of FIG. 10, respectively.

Figure 10:
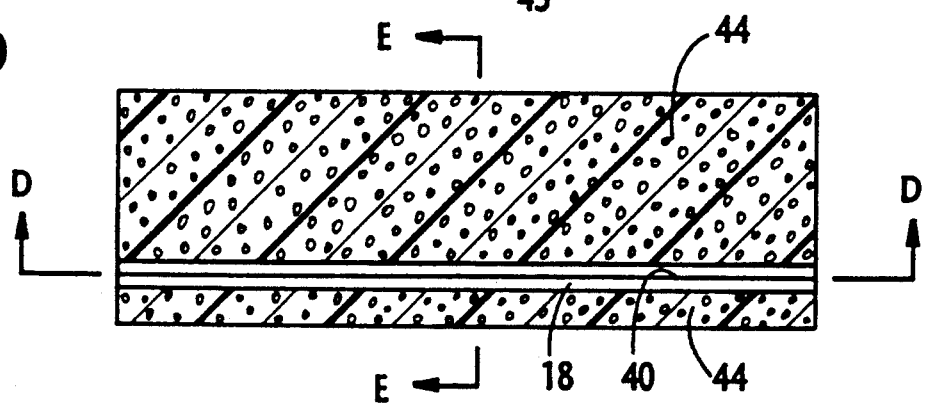

In FIG. 10, numeral 40 depicts a valley line of the groove 18 which will be divided, at the following fabricating steps, into the three grooves sections 18a–18c (FIGS. 1 and 2). As shown in FIG. 12, the groove 18 has a V-shaped cross section and is provided with slanted walls each surface of which is a plane equivalent to (111). As shown in FIGS. 11 and 12, the space 15 has been formed in the bottom surface of the silicon substrate 14.

Figure 11:
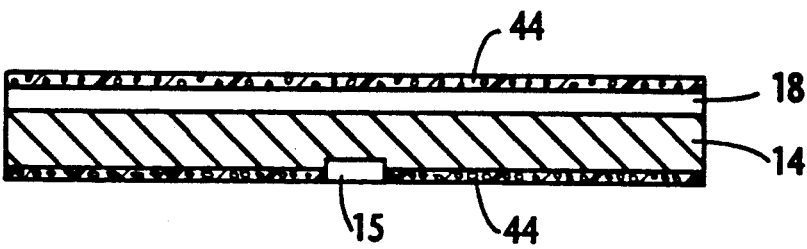
Figure 12:
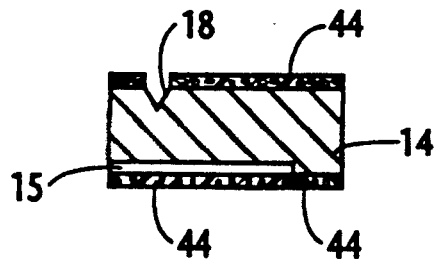

Following this, the oxidized silicon layer 44 shown in FIGS. 10–12 are removed. Following this the lower major surface of the substrate is fixed to the glass plate 15 using silicon-to-glass electrostatic bonding techniques (for example).

The subsequent fabricating steps will be discussed with reference to FIGS. 13–15.

Figure 13:
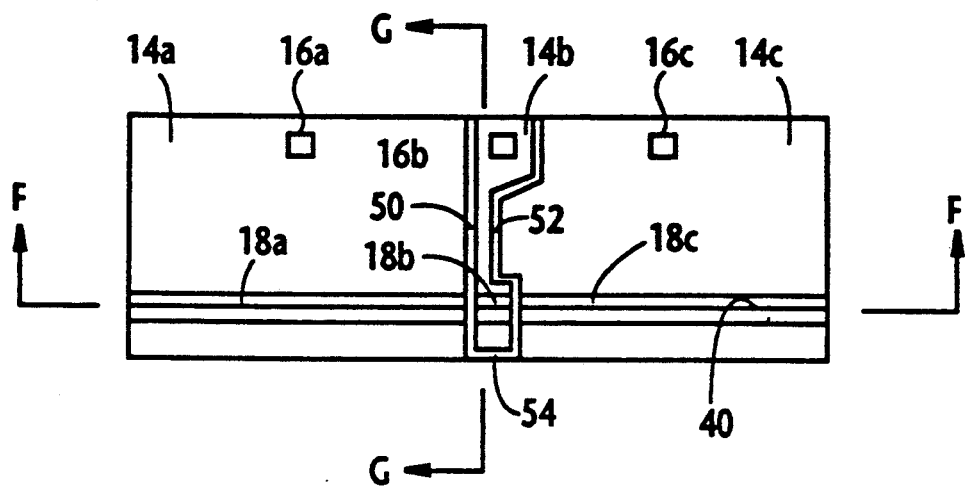
FIG. 13 is a plan view showing the embodiment in a semi-completed state.
Figure 14:
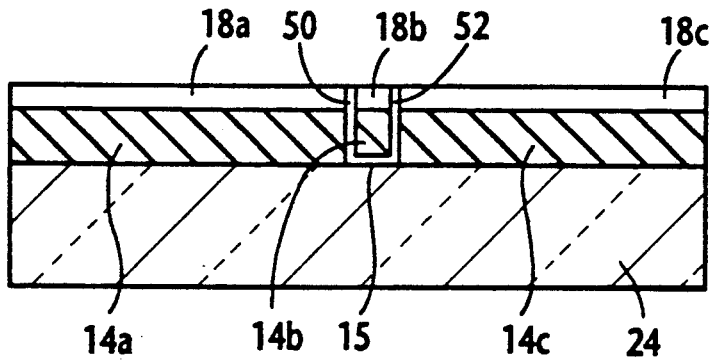
FIGS. 14 and 15 are view as taken along section lines F—F and G—G respectively.
Figure 15:
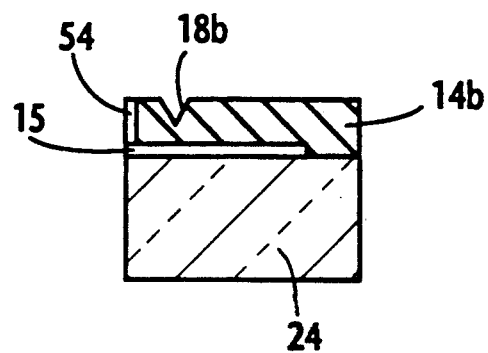

FIG. 13 is a top plan view of the optical filter before the optical fibers 20a–20c are provided, while FIGS. 14, 15 are respectively sectional views taken along section lines F—F and G—G of FIG. 13. Two vertical elongated through-openings 50, 52 are formed to provide the movable portion C, shown in FIGS. 1 and 3, using laser beams, ion millings, etc. Further, the bottom portion of the movable portion C is removed, using the same techniques as mentioned above, to form a space denoted by numeral 54.

Finally, the three optical fibers 20a–20b are provided as shown in FIGS. 1 and 2. As mentioned above, the mirror is deposited on the right-hand endface of each of the optical fibers 20a, 20b and the tuning is achieved by changing the optical length between the two mirrors.

The above mentioned method is merely exemplary, and any other suitable methods are applicable in fabricating the tunable Fabry-Perot elaton filter of the present invention.

For example, the vertical elongated through-openings 52, 54 can be formed by anisotropic etching techniques known in the art. In this instance, (a) each of the major surfaces of the silicon substrate 14 is made to exhibit a (110) plane and (b) the etching is implemented such that the side wall of each of the vertical through-openings 52, 54 is a plane equivalent to a (111) plane.

It will be understood that the above disclosure is representative of only one possible embodiment of the present invention and that the concept on which the invention is based is not specifically limited thereto.

What is claimed is:

1. A tunable Fabry-Perot etalon optical filter, comprising:
   a substrate which is divided into first, second and third substrate portions, said second substrate portion being arranged in a manner to be adjacent to said first and third substrate portions and displaceable with respect to said first and third substrate portions in response to a voltage difference between said second substrate portion and one of said first and third substrate portions; and
   first, second and third optical fibers portions which are respectively positioned on said first, second and third substrate portions, each of first and third optical fiber portions being provided with a mirror at the endface thereof for acting as an optical filter.

2. A tunable Fabry-Perot etalon optical filter as claimed in claim 1, wherein said substrate is a silicon substrate.

3. A tunable Fabry-Perot etalon optical filter as claimed in claim 1, wherein each of said first, second and third portions is provided with an electrode.

4. A tunable Fabry-Perot etalon optical filter as claimed in claim 1, wherein said second substrate portion has first and second regions, said first region being rigidly coupled to said first and second substrate portions, and said second region separated from said first and second substrate portions and being displaceable in response to the voltage difference.

5. A tunable Fabry-Perot etalon optical filter as claimed in claim 4, wherein said substrate has a portion which is fixedly attached to a base member and wherein said second region is movable with respect to said base member.

6. A tunable Fabry-Perot etalon optical filter comprising:
   means defining a pendulum-like member in a substrate:
   a first optical fiber portion supported on said pendulum-like member, said first optical fiber portion having a first mirror formed on an endface thereof;
   second and third fiber portions being supported on said substrate in a predetermined relationship with respect to said first optical fiber portion, one of said second and third fiber portions having a second mirror formed on an endface thereof.

7. A tunable Fabry-Perot etalon optical filter as claimed in claim 6, further comprising:
   means for creating a voltage across said pendulum member and a selected portion of said substrate.

8. A tunable Fabry-Perot etalon optical filter as claimed in claim 6, wherein said pendulum-like member is responsive to a voltage difference between the pendulum-like member and a selected portion of said substrate.

* * * * *